United States Patent
Corry

[15] 3,670,576
[45] June 20, 1972

[54] TEMPERATURE COMPENSATOR FOR A PRESSURE GAUGE

[72] Inventor: Stuart E. Corry, 4511 S. Lewis Place, Tulsa, Okla. 74105

[22] Filed: Dec. 23, 1970

[21] Appl. No.: 100,880

[52] U.S. Cl. ................................73/393, 73/368.3, 177/209
[51] Int. Cl. ..........................................................G01l 19/04
[58] Field of Search ......................73/393, 368.3, 368.8, 419; 92/1, 5 R; 177/208, 209

[56] References Cited

UNITED STATES PATENTS 2,324,217   7/1943   Knauth....................................73/393

Primary Examiner—Donald O. Woodiel
Attorney—Head & Johnson

[57] ABSTRACT

A temperature compensator for a pressure gauge or the like, including a body having a first and second cylindrical cavity coaxial of each other and communicating with each other, a sensing port communicating with one end of the first cylindrical cavity, a vent port communicating with the other end of the first cylindrical cavity, and a compensating port communicating with the second cylindrical cavity, a sense responsive piston positioned in the first cavity intermediate the sensing and vent ports, a compensating piston positioned in the second cavity, the sense responsive and compensating pistons being affixed to each other for simultaneous axial movement, resilient means urging the sense responsive piston towards the sensing port and thereby the compensating piston towards the compensating port, and a closed temperature sensing vessel having communication with the sensing port.

5 Claims, 3 Drawing Figures

INVENTOR.
STUART E. CORRY

BY
Head & Johnson
ATTORNEYS

INVENTOR.
STUART E. CORRY
BY
Head & Johnson
ATTORNEYS

1

TEMPERATURE COMPENSATOR FOR A PRESSURE GAUGE

BACKGROUND, SUMMARY AND OBJECTS OF THE INVENTION

Hydraulic or pneumatic load cells are frequently used for weight and force measurements in industry. In a simple application only a single load cell may be required but in many industrial applications more than one load cell is needed. To weigh a vessel it is sometimes necessary to employ two, three, or four load cells depending upon the size and method of support of the vessel. When the load cells are used to weigh trucks, four, six, or even eight load cells may be required, one being positioned under each wheel or set of wheels of the truck, to ascertain the total vehicle weight.

In order that weight or force measurements detected by a plurality of load cells can provide a single indication of the total weight or force being measured, the use of pressure totalizers or pressure integrators is employed. For more information about such pressure totalizers reference may be had to U.S. Pat. No. 3,198,014, issued Aug. 3, 1965, Stuart E. Corry, inventor, and entitled "Pressure Integrator." Pressure integrators utilize a piston which is moved in the integrator to force fluid to a pressure indicating gauge. The piston is moved by the summation of a plurality of pressures and thereby the pressure applied by the integrator to the single gauge is indicative of a summation or integration of a plurality of weights or forces. The use of pressure integrators is completely satisfactory for many applications. One problem, however, which is sometimes encountered, is that of fluctuation of gauge readings due to temperature changes. The hydraulic fluid normally employed in the line between the pressure integrator and the totalizing gauge represents a fixed and confined volume. When the integrator piston moves so that the fluid volume is shifted towards or away from the gauge, the gauge reflects such movement, but regardless of the position of the piston the volume of fluid contained in the interior of the integrator summarization piston and in the line between the integrator and the gauge remains fixed. If the temperature of this fluid increases, the movement of the fluid is, at least partially, toward the gauge which causes the gauge to reflect a higher reading. Correspondingly, if the temperature of this fixed volume of fluid decreases, the gauge reflects a decreased rating. This invention provides a device for overcoming the problems of the above described.

It is therefore a primary and basic object of the invention to provide a temperature compensator for a pressure gauge or the like.

A more particular object of this invention is to provide a device which may be affixed to a pressure indicating gauge for automatically compensating for temperature changes whereby the gauge accurately reflects pressure applied to it irrespective of temperature changes.

A still more particular object of this invention is to provide a temperature compensator for inserting in communication with the line between a pressure integrator and pressure gauge so that the pressure gauge is thereby unaffected by temperature changes.

These and more particular objects of the invention will be fulfilled by apparatus described in the following specification and claims, taken on conjunction with the attached drawings.

DESCRIPTION OF THE VIEWS

DETAILED DESCRIPTION

Figure 1:
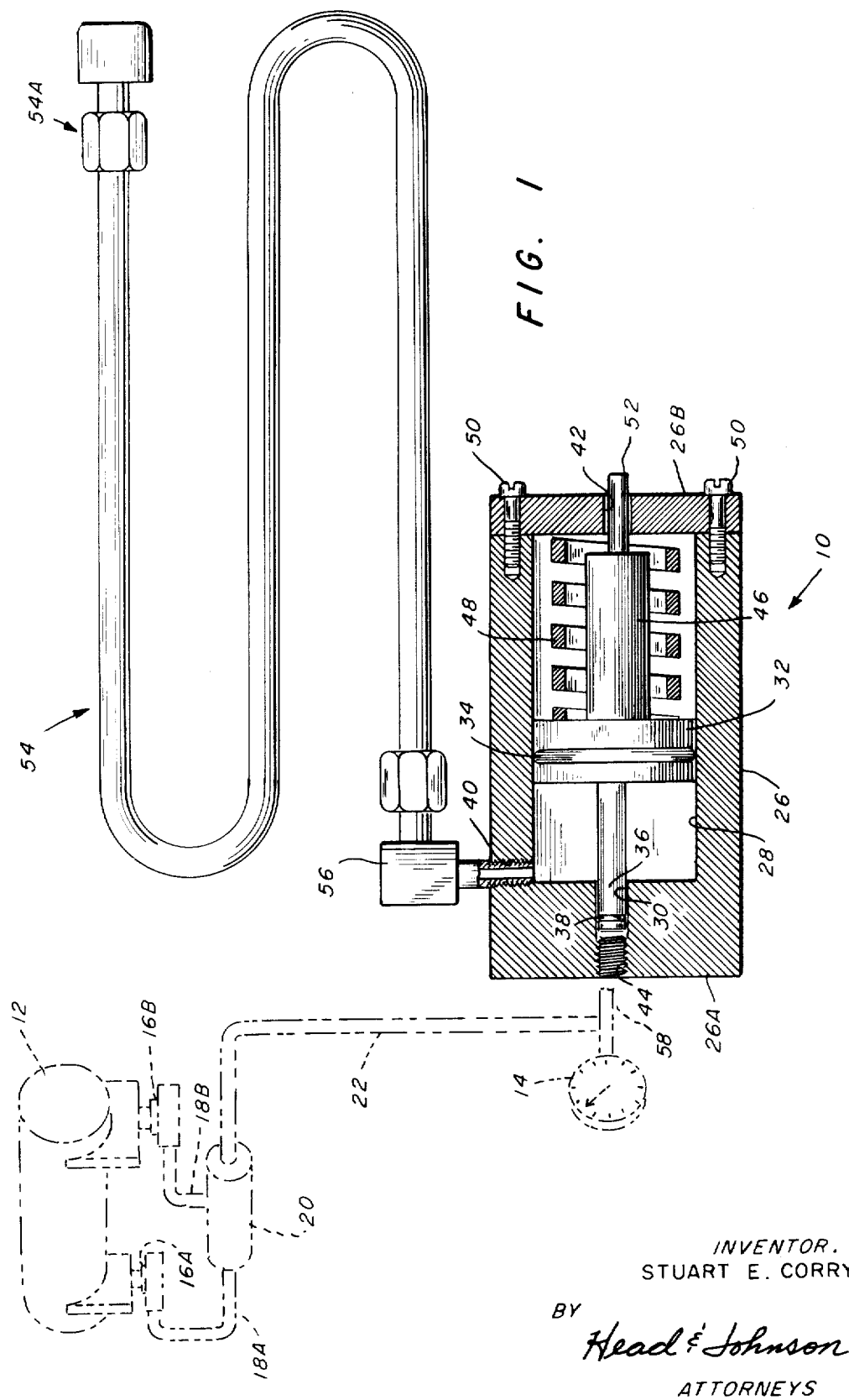
FIG. 1 is a diagrammatic representation of a temperature compensator, shown in cross section, as applied to a pressure integrator and pressure gauge for indicating the weight of a vessel, the temperature compensator serving to compensate for changes in temperature in the hydraulic fluid between the integrator and the gauge.

Referring to FIG. 1, a temperature compensator is shown in cross-sectional view and generally indicated by the numeral 10. The temperature compensator 10 will be described as it is utilized as a part of a system for indicating the weight of a vessel 12 by means of a gauge 14. Vessel 12 rests on load cells 16A and 16B, each of which applies hydraulic pressure by way of lines 18A and 18B respectively, to a pressure integrator or totalizer 20. As previously mentioned, U. S. Pat. No. 3,198,014 describes in detail a pressure integrator of the type exemplified by the numeral 20. The output of integrator 20 at line 22 is a pressure representative of the total applied by the two load cells 16. The volume of fluid in line 22, in gauge 14, and in the totalizing cylinder of integrator 20 remains fixed. When a temperature change occurs in this fixed fluid volume, the reading of gauge 14 will change. Since gauge 14 is utilized to indicate the total weight of vessel 12 and thereby to indicate the change in the quantity of contents of the vessel, a change in temperature would thereby cause an erroneous reading as to the quantity of contents of the vessel. The function of the temperature compensator 10 of this invention is to compensate for temperature change so that gauge 14 accurately reflects the pressure outlet from integrator 20 regardless of temperature change.

The integrator 10 includes a body 26 having a first closed end 26A and a second closed end 26B. Within the body is a first cylindrical cavity 28 and, coaxially with it, a second cylindrical cavity 30. The cavity 30 communicates with the first cavity 28. Slidably positioned within the first cavity 28 is a sense responsive piston 32 which may include an O-ring 34 to insure that no leakage occurs past the piston. In a similar manner, positioned within the second cylindrical cavity 30 is a compensating piston 36 which is also shown as having an O-ring 38. Pistons 30 and 32 are coaxial of each other and are affixed to each other for simultaneous axial movement within body 26.

Communicating with first cylindrical cavity 28 adjacent body first end 26A is a sensing port 40. In addition, communicating with the first cylindrical cavity 28 at body end 26B is a vent port 42. Communicating with the second cylindrical cavity 30 is a compensating port 44.

Affixed to and extending coaxially from sense responsive piston 32 is a spring guide 46. Filled about guide 46 is a compressed coiled spring 48 which extends between piston 32 and body end 26B to resiliently urge piston 32 in the direction towards sensing port 40. End 26B is shown as being removable and held to the body 26 by means of bolts 50. Affixed to the outer end of spring guide 46 is a coaxial rod 52 which serves to give visual indication of the position of pistons 32 and 36 in the compensator.

Communicating with sensing ports 40 is a closed temperature sensing vessel generally indicated by the numeral 54. In the illustrated arrangement the vessel 54 is in the form of a tube closed at its outer end 54A and having the inner end suitably engaging the sensing port 40, such as by means of a compression fitting 56.

While the temperature compensator functions either on the hydraulic or pneumatic systems, the most common application is with hydraulic systems. When used with a hydraulic system the interior of cylinder 28 between sensing port 40 and piston 32 is filled with hydraulic fluid, and the temperature sensing vessel 54 is filled with such fluid. Cavity 30 is filled with hydraulic fluid. Port 44 receives a line 58 which extends to the line 22 so that the pressure of fluid in line 22, and thereby in gauge 14, is the same as that in second cylindrical cavity 30.

OPERATION OF EMBODIMENT OF FIGURE 1

Compensator 10 functions for temperature changes on the system load cells 16A and 16B and integrator 20 by a volume balance design placed on the output of the integrators with the same pressure imposed on it as is on the read out gauge 14. The function of compensator 10 is such that the pressure on piston 36 balances against spring 48 on the vented side of the piston 32. Fluid is filled in the cylinder 26 through the temperature sensing tube 54, and is filled at the time maximum pressure is on the spring 48 by the force of the integrator on piston 36 and when the temperature of both systems are the same. An additional pressure is put in cylinder 28 to compress the spring 48 an additional small amount. The compensator system is now ready to operate.

As the temperature decreases the contraction of the fluid in temperature sensing vessel 54 and cylinder 28 allows the force in spring 48 to move the piston 36 into the cylinder 30 replacing the loss of fluid volume caused by the temperature drop in the load cell and in line 22. As the temperature increases, the increase in volume of fluid in cylinder 28 and temperature sensing vessel 54 compresses the spring 48, moving the piston 36 out of the cylinder 30 reducing the pressure that has been increased by the rise in temperature in the load cell and integrator system.

ALTERNATE EMBODIMENT

Figure 2:
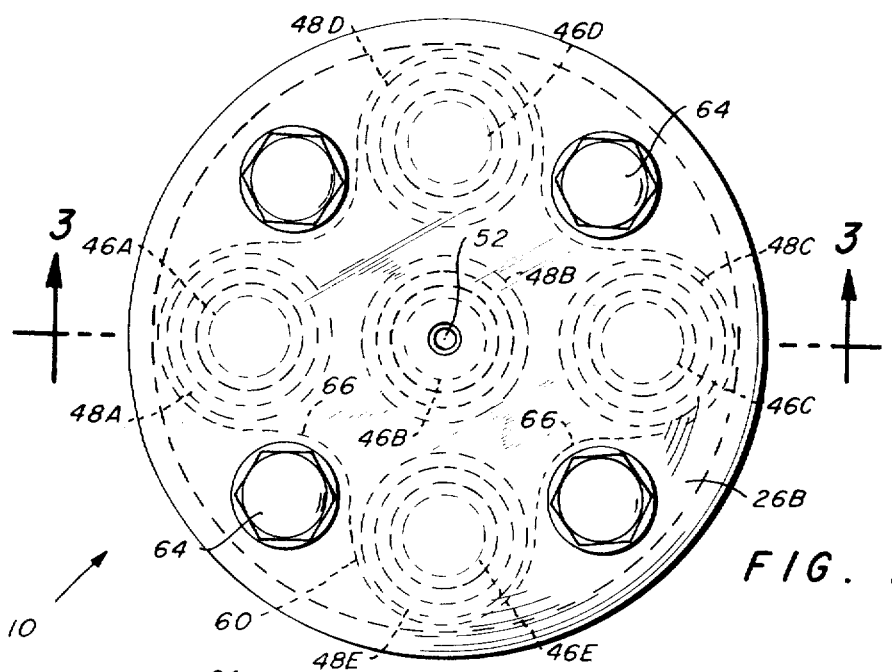
FIG. 2 is an end view of an embodiment of the temperature compensator of this invention.
Figure 3:
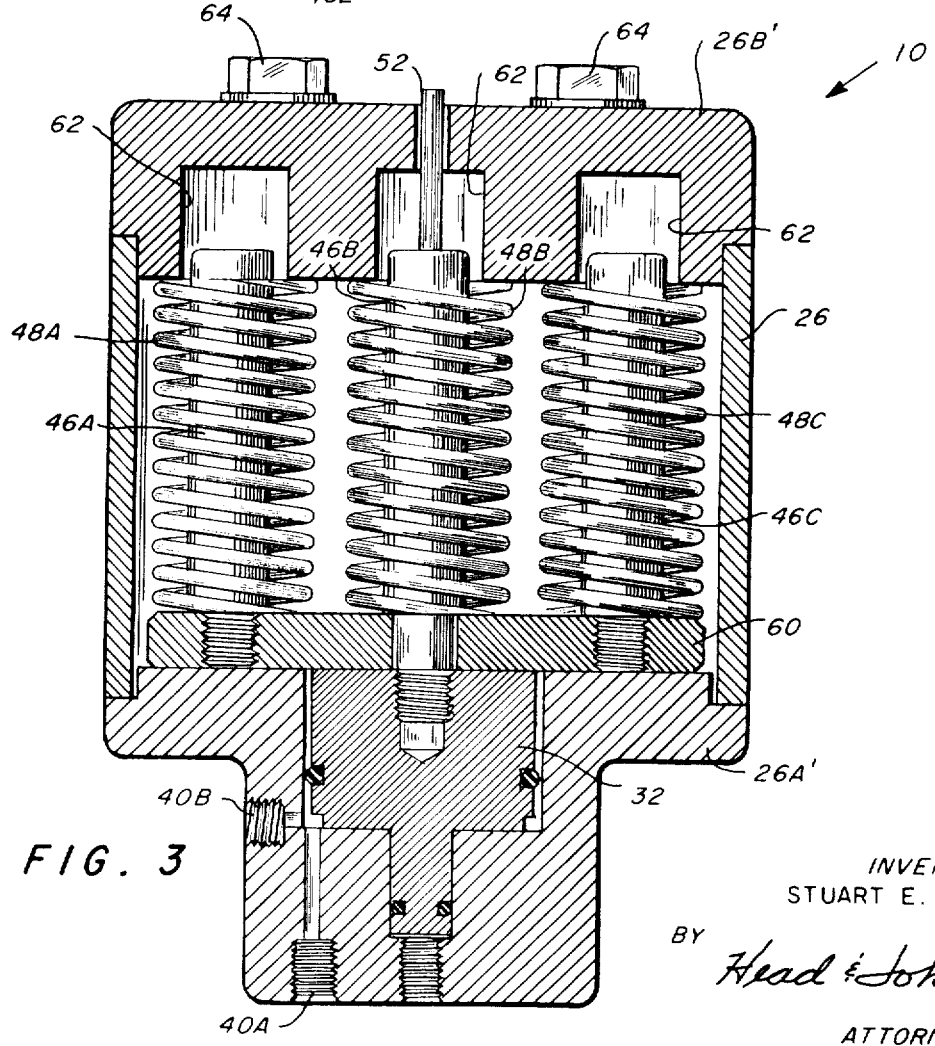
FIG. 3 is a cross-sectional view taken along the line 3—3 of FIG. 2.

FIGS. 2 and 3 show an alternate embodiment of the pressure integrator. The embodiments of FIGS. 2 and 3 function exactly the same as described with reference to FIG. 1 but illustrate a more sophisticated design, more representative of a typical commercial product embodying the invention. A plate 60 is affixed to the sense responsive piston 32. Extending from plate 60 are a plurality of spring guides, there being five such guides illustrated identified by the numerals 46A through 46E.

Each of the spring guides 46A through 46E is parallel to the axis of piston 32 and guide 46B is coaxial with piston 32. Each of the guides receive a coiled compression spring, being designated 48A through 48E. Rod 52 extends from the spring guide 46B.

The body end 26B' in the embodiment of FIGS. 2 and 3 includes recesses 62, there being one recess for each of the spring guides. Bolts 64 extend from the body end 26B' to the opposed body end 26A' as a means of assembly of the components of the body together. Plate 60 has notches 66 to receive bolts 64 so that piston 32 moves freely in response to hydraulic pressure. Instead of notches 66, plate 60 may be provided with openings to receive bolts 64.

Two sensing ports 40A and 40B are shown for convenience in making connection to the temperature sensing system. One or the other of the sensing ports 40A and 40B will normally be closed by a plug. The embodiment of FIGS. 2 and 3 functions exactly the same as described with reference to the embodiment of FIG. 1.

It can be seen that the essence of the invention is the concept of removing fluid from a closed indicating system in which the volume of the fluid has been increased by temperature by a compensator actuated by the same temperature increase.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification but is limited only by the scope of the attached claim or claims, including the full range of equivalency to which each element thereof is entitled.

What is claimed:

1. A temperature compensator for a pressure gauge or the like comprising:
    a body having a first cylindrical cavity and a second cylindrical cavity coaxial with and communicating with the first, a sensing port communicating with one end of the first cylindrical cavity and a vent port communicating with the other end of the first cylindrical cavity, and a compensating port communicating with the second cylindrical cavity;
    a sense responsive piston positioned in said first cavity intermediate said sensing and vent ports;
    a compensating piston positioned in said second cavity, said sense responsive and compensating pistons being affixed to each other for simultaneous axial movement;
    resilient means urging said sense responsive piston towards each sensing port and thereby said compensating piston towards said compensating port; and
    a closed temperature sensing vessel having communication with said sensing port.

2. A temperature compensator according to claim 1 wherein said temperature sensing vessel is in the form of a tube having one end closed and the other communicating with said sensing port.

3. A temperature compensator according to claim 1 wherein said first cylinder cavity between said sensing port and said sense responsive piston, and said temperature sensing vessel, are filled with a heat expanding liquid.

4. A temperature compensator according to claim 1 wherein said vent opening in said body is coaxial with said cylindrical cavities and including:
    an indicating rod affixed coaxially to said sense responsive piston and coaxially received in said vent opening and extending partially exteriorly of said body.

5. A temperature compensator for a pressure gauge according to claim 1 including:
    a plurality of spring guide members affixed to and extending from and parallel the axis of said sense responsive piston in the direction opposite said sense port, and wherein said resilient means includes a spring compressibly received about each of said spring guides and urging said sense responsive piston towards said sense port.

* * * * *